(12) United States Patent
Collison et al.

(10) Patent No.: US 11,388,058 B2
(45) Date of Patent: Jul. 12, 2022

(54) SYSTEM AND METHOD FOR A DISTRIBUTED COMPUTING CLUSTER ARCHITECTURE

(71) Applicant: Synadia Communications Inc., Los Angeles, CA (US)

(72) Inventors: Derek Collison, Beverly Hills, CA (US); Ivan Kozlovic, Highlands Ranch, CO (US)

(73) Assignee: Synadia Communications Inc., Los Angeles, CA (US)

( * ) Notice: Subject to any disclaimer, the term of this patent is extended or adjusted under 35 U.S.C. 154(b) by 0 days.

(21) Appl. No.: 16/530,363

(22) Filed: Aug. 2, 2019

(65) Prior Publication Data
US 2020/0044934 A1 Feb. 6, 2020

Related U.S. Application Data

(60) Provisional application No. 62/713,945, filed on Aug. 2, 2018.

(51) Int. Cl.
*H04L 41/12* (2022.01)
*H04L 67/10* (2022.01)
*H04L 41/0803* (2022.01)
*H04L 67/141* (2022.01)
*H04L 12/66* (2006.01)

(52) U.S. Cl.
CPC ............ *H04L 41/12* (2013.01); *H04L 12/66* (2013.01); *H04L 41/0803* (2013.01); *H04L 67/10* (2013.01); *H04L 67/141* (2013.01)

(58) Field of Classification Search
CPC ..... H04L 41/12; H04L 12/66; H04L 41/0803; H04L 67/141; H04L 67/10
USPC ................................................. 709/222, 223
See application file for complete search history.

(56) References Cited

U.S. PATENT DOCUMENTS

| 3,859,466 A * | 1/1975 | Hartmann ............. H04J 3/0676 370/507 |
| 8,948,106 B2 * | 2/2015 | Hannu ................... H04W 76/27 370/329 |
| 2006/0126501 A1 * | 6/2006 | Ramaswamy .......... H04L 45/22 370/221 |
| 2009/0100289 A1 * | 4/2009 | Chen ..................... G06F 11/203 714/4.11 |

(Continued)

*Primary Examiner* — David R Lazaro
*Assistant Examiner* — Mariegeorges A Henry
(74) *Attorney, Agent, or Firm* — Alpine Patents LLC; Brian Van Osdol

(57) ABSTRACT

A system and method for managing a system topology of a distributed computing system comprising: providing a network of clusters with at least a first cluster and a second cluster; configuring the first cluster with an external gateway configuration of the second cluster; distributing the external gateway configuration across at least a subset of nodes of the first cluster; establishing a connection between all clusters from the network of clusters, which for the first and second cluster comprises: for each node of the first cluster, establishing a single outbound connection to a select node of the second cluster; and managing communication over the system topology comprising: at a receiver node of the second cluster, propagating a subscription interest, and at an origin node of the first cluster, transmitting communications over the connection according to the subscription interest.

15 Claims, 9 Drawing Sheets

(56) References Cited

U.S. PATENT DOCUMENTS

| | | | |
|---|---|---|---|
| 2015/0055544 A1* | 2/2015 | Lee | H04W 36/04 370/312 |
| 2015/0287207 A1* | 10/2015 | Bartmann | G06T 7/30 382/106 |
| 2017/0372576 A1* | 12/2017 | Choe | H04W 52/18 |
| 2018/0092049 A1* | 3/2018 | Liu | H04W 52/343 |
| 2018/0145945 A1 | 5/2018 | Hyde et al. | |
| 2018/0287965 A1* | 10/2018 | Sindhu | H04L 49/10 |
| 2019/0385057 A1* | 12/2019 | Litichever | H04L 63/1416 |

\* cited by examiner

```
┌─────────────────────────────────────────────────────────────┐
│  Providing a network of computing clusters with at least a  │
│         first cluster and a second cluster. S110            │
└─────────────────────────────────────────────────────────────┘
┌─────────────────────────────────────────────────────────────┐
│   Configuring the first cluster with an external gateway   │
│          configuration of the second cluster. S120          │
└─────────────────────────────────────────────────────────────┘
┌─────────────────────────────────────────────────────────────┐
│  Distributing the external gateway configuration across at  │
│    least a subset of nodes of the first cluster. S130       │
└─────────────────────────────────────────────────────────────┘
┌─────────────────────────────────────────────────────────────┐
│   Establishing a connection between all clusters from the   │
│               network of clusters S140                      │
│  ┌───────────────────────────────────────────────────────┐  │
│  │ For each node of the first cluster, establishing a    │  │
│  │  single outbound connection to a select node of the   │  │
│  │                 second cluster S142                   │  │
│  └───────────────────────────────────────────────────────┘  │
└─────────────────────────────────────────────────────────────┘
┌─────────────────────────────────────────────────────────────┐
│   Managing communication over the system topology S150      │
│  ┌───────────────────────────────────────────────────────┐  │
│  │              At a receiver node:                      │  │
│  │  ┌─────────────────────────────────────────────────┐  │  │
│  │  │   Propagating a subscription interest S152      │  │  │
│  │  └─────────────────────────────────────────────────┘  │  │
│  └───────────────────────────────────────────────────────┘  │
│  ┌───────────────────────────────────────────────────────┐  │
│  │               At an origin node:                      │  │
│  │  ┌─────────────────────────────────────────────────┐  │  │
│  │  │   Transmitting communications over the          │  │  │
│  │  │  connection according to the subsciprtion       │  │  │
│  │  │              interest S154                      │  │  │
│  │  └─────────────────────────────────────────────────┘  │  │
│  └───────────────────────────────────────────────────────┘  │
└─────────────────────────────────────────────────────────────┘
```

FIGURE 1

```
gateway {
  name: "A"
  port: 6222
  authorization {
   (...)
  }
  tls {
   (...)
  }
  gateways = [
    {
        name: "B"
        urls: [ "nats://host1-in-cluster-b:6222",
                "nats://host2-in-cluster-b:6222" ]
        tls {
           (...)
        }
    },
    {
        name: "C"
        url: "nats://host-in-cluster-c:6222"
        tls {
           (...)
        }
    }
  ]
}
```

FIGURE 2

SYSTEM AND METHOD FOR A DISTRIBUTED COMPUTING CLUSTER ARCHITECTURE

CROSS-REFERENCE TO RELATED APPLICATIONS

This application claims the benefit of U.S. Provisional Application No. 62/713,945, filed on 2 Aug. 2018, which is incorporated in its entirety by this reference.

TECHNICAL FIELD

This invention relates generally to the field of computer network architecture, and more specifically to a new and useful system and method for a distributed computing cluster architecture.

BACKGROUND

Distributed computing is widely used to power today's software solutions. Various use-cases such as mobile apps, real-time media and communication, IoT platforms, and countless other use-cases make use of computing resources distributed across distinct computing clusters.

Communication and execution of services that run within a distributed system, however, face many challenges such as latency issues, scalability challenges, resiliency to point of failures, and the like. Different solutions have been presented to address some of these issues. For example, one solution elects one or a subset of servers in a cluster to act as a gatekeeper for connections between clusters. However, the gatekeepers introduce an additional connection point when connecting two clusters, which can impact latency, resiliency, and scalability. Thus, there is a need in the computer network architecture field to create a new and useful system and method for a distributed computing cluster architecture. This invention provides such a new and useful system and method.

BRIEF DESCRIPTION OF THE FIGURES

FIG. 1 is a flowchart representation of a method of a preferred embodiment;

FIG. 2 is a schematic representation of an exemplary connection configuration;

DESCRIPTION OF THE EMBODIMENTS

Figure 3:
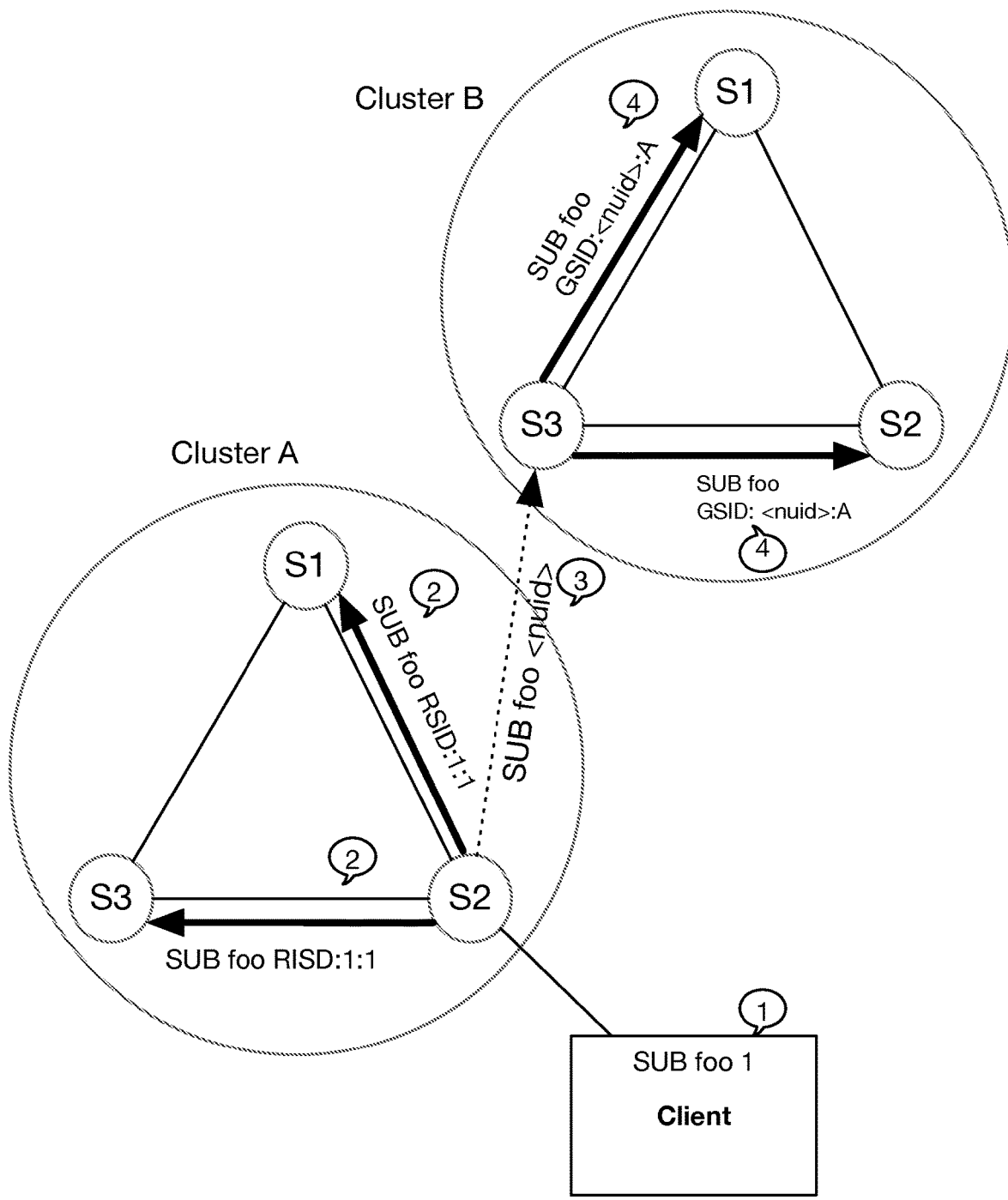
FIG. 3 is an exemplary representations of a scenario of interest propagation.

The following description of the embodiments of the invention is not intended to limit the invention to these embodiments but rather to enable a person skilled in the art to make and use this invention.

1. Overview

A system and method for a distributed computing cluster architecture functions to establish a globally accessible communication channel through which distributed computing systems can reliably and scalably interact. In some implementations, the system and method can enable a distributed computing system to make use of a single Universal Resource Identifier (URI) in coordinating communication, where the URI is globally aware and location aware. The system and method preferably establishes a network of computing clusters, each with a set of computing resource nodes (e.g., servers). The system and method preferably facilitate each node within a given cluster having an outbound connection to a node of a connected cluster (i.e., adjacent cluster). The system and method may be used to enable a full mesh, one-hop computer network. That is, a network wherein each node within a cluster has a connection to each other node with the same cluster (i.e., full mesh), and wherein each node within a cluster has at least one outbound connection to a node within an adjacent network and zero or more inbound connections from that adjacent network (i.e., spline network). In a preferred variation, routes of the network can form a true full mesh, interest only topology. Outbound gateway connections can enable scalable and global topologies to be formed by connecting clusters together. As the network topology changes (e.g., clusters are added and/or removed, adjacencies change, servers are added/removed from clusters), the system and method may further comprise of updating the connections to maintain an intra-cluster full mesh network and an inter-cluster spline network.

The system and method may support request and reply communications, load balanced messaging, data streaming, and/or other forms of data communications within a distributed computing system. The system and method may have use in communication solutions for cloud native applications, (Internet of Things) IoT messaging, microservice architectures, and/or other software systems.

As one preferred application, companies or services may utilize the system and method to perform cross-cloud communications. It can enable information to be propagated across different cloud compute providers without adding significant infrastructure to support this solution. This may be used to extend messaging infrastructure. This may additionally or alternatively be used for event propagation across cloud.

As another preferred application, the system and method may be used in implementing edge computing. The enhancements to distributed computing can provide a number of benefits to edge computing applications.

The system and method in one variation can be offered as configuration for a server where the server includes computer executable instructions for a computing device to act as or to facilitate the system and method. The server executable could be offered as a binary or in any suitable format. In another variation, the system and method may be used within a multi-tenant computing platform, wherein different computer systems or services for different account holders are executed in part through the system and method implemented within the computing platform. For example, the system and method may be implemented by a cloud computing IaaS (Infrastructure as a service) system. In a related variation, the system and method can be used within a single tenant computing system. The system and method may alternatively be offered in any suitable form of offering.

As one potential benefit, the system and method may exhibit reduced latency across communications. The system and method can preferably avoid additional network hops. For example, two clients communicating across two computing clusters would have a first hop between client 1 and a first node in a first computing cluster, a second hop between the first node and a second node in the second computing cluster, and a third hop between the second node and client 2.

As a related potential benefit, the system and method can be made resilient to node failures. Unlike network topologies that use some form of node prioritization (e.g., master nodes), the system and method preferably has each node in a cluster able to connect directly to an outside adjacent cluster. The sharing of configuration may allow a node to circumvent a node failure.

Another potential benefit is the scalability of the system and method with respect to existing full mesh cluster network. As the number of clusters with multiple nodes increases, the number of connections that each node maintains can increase exponentially in other approaches. The system and method can avoid exponential scaling of node connections.

Another potential benefit is that changes in the cluster states are updated regularly, and that new cluster information is used to update the network dynamically. As clusters are added and removed and as nodes are added and removed from clusters, information reported to adjacent clusters are updated allowing for efficient remapping of the network making sure that nodes are continuously kept connect and improving the resiliency of the network.

As another potential benefit, the system and method can provide an interest subscription model that is adaptive to the communication patterns between clusters. In some variations, the interest subscription approach can function to reduce network traffic, which can translate to reduced computation for nodes of the clusters.

2. Method

As shown in FIG. 1, a method for managing a system topology of a distributed computing system preferably includes: providing a network of clusters with at least a first cluster and a second cluster Silo; configuring the first cluster with an external gateway configuration of the second cluster S120; distributing the external gateway configuration across at least a subset of nodes of the first cluster S130; establishing a connection between all clusters from the network of clusters S140, which for the first and second cluster comprises, for each node of the first cluster, establishing a single outbound connection to a select node of the second cluster; and managing communication over the system topology S150. Wherein managing communication over the system topology S150 includes: at a receiver node, propagating a subscription interest S152; and at an origin node of the first cluster, transmitting communications over the connection according to the subscription interest S154.

The method functions to build and maintain a functional network topology that enables efficient inter- and intra-cluster communication. Additionally, the method functions to enable connections and communication between different topologies, providing both efficiency and security to the network. The method preferably functions with a system substantially similar to the one described herein, but may alternatively be implemented with any suitable system.

Block S110, which includes providing a network of clusters with at least a first cluster and a second cluster, functions to set up or instantiate an initial computing network architecture. Block Silo preferably includes providing a plurality of computing clusters, but may alternatively include providing a single computing cluster, wherein each computing cluster includes at least one node. Providing a computing cluster may include providing a set of nodes within the cluster. In some variations, each node of a cluster is a gateway node, wherein a gateway node has a single outbound connection to a select node for each adjacent cluster in the system topology. In other variations, a cluster may include a set of internal nodes and a set of gateway nodes, wherein the internal nodes do not have gateway access. Block Silo may additionally provide additional resources. These specialized resources may include: specialized computing clusters with pre-set topologies (e.g., privately controlled clusters), specialized nodes with unique properties (e.g., leaf nodes), client applications.

Providing a network of clusters may instantiate the clusters and/or add clusters in a variety of conditions. In one variation, an existing infrastructure is migrated to a method for managing the system topology as described herein. In another variation, the clusters are instantiated for the first time and brought up incrementally through the proceeding processes to begin managing the system topology as described herein. In yet another variation, a portion of the provided network of clusters may previously be operating and managed in a manner consistent with the topology approach described herein, but a subset of cluster resources are newly setup into the topology and management approach. Accordingly, providing a network of clusters with at least a first cluster and a second cluster S110 may include providing fully connected and functioning clusters, but may alternatively include clusters that are not connected.

In a preferred variation, providing a network of clusters S110 includes providing clusters with a full mesh topology, wherein in a full mesh topology all nodes within a cluster have at least one bi-directional connection to all other nodes within the same cluster. Alternatively, a cluster may incorporate another internal network topology. In one variation, the process of providing the network cluster may include modifying the internal network topology such that it is a full mesh. In another variation, the process of providing the network cluster does not modify the internal network topology. In a third variation, some modification is made to the internal network topology.

Block S120, which includes configuring the first cluster with an external gateway configuration of the second cluster, functions to setup an outgoing connection from a computing node in the first cluster to a computing node in the second cluster. Additionally, block 120 may include sharing network topology information between the first cluster and second cluster. The network topology information is preferably used to provide configuration information of the second cluster to the first cluster such that information concerning the active nodes (e.g., gateway nodes) of the second cluster is known such that outbound connections established in block S140 can be appropriately made.

In one variation, once an active connection is setup between the first and the second cluster, the second cluster shares the topology information of all the nodes within the second cluster with the first cluster. Alternatively, the second cluster may share information about part of the second cluster's topology with the first cluster. For example, information about secure and private nodes may not be shared with the first cluster. Sharing topological information may be open or encrypted. Sharing topological information may be broad range of information about each node, but can alternatively be sufficient information to allow the first cluster to connect to each shared node without providing any additional information. The sufficient information preferably contains a URI for each node in the shared topology. In one variation, a single URL may be used, but an array of URLs may alternatively be used.

In one implementation, the external gateway configuration may provide the sufficient information and preferred connections details. In a second implementation, as shown in FIG. 2, the external gateway configuration can specify parameters such as a name, a URI/URL, port information, authorization information, implementation specifications, and/or other parameters.

As the second cluster changes, configuring the first cluster with external gateway configuration of the second cluster S120, may update and share the new and updated information with the first cluster. In one preferred variation, the level of detail provided will be the same every time S120 is called. In another preferred variation, the level of detail may change over time, or due to external factors. For example, if the external gateway has determined the connection to the first cluster is insecure (e.g., data breach), S120 may provide less information, or suggest a connection to a more secure/isolated region of the cluster. Updated information may include: changes of topology with the second cluster (e.g. addition or removal of nodes), address changes within the second cluster, and/or any other pertinent information.

More generally, the method can include propagating and configuring external gateway configuration across the network of clusters, which functions to share pertinent information. Knowledge and awareness of other clusters is preferably shared across the network of clusters. In this way, a cluster may discover a previously unknown cluster when the external gateway configuration is shared by a known cluster. Similarly, new clusters can be more seamlessly onboarded by sharing its gateway configuration with one cluster, which results in distribution across all appropriate clusters. Also, changes within a cluster (e.g., newly activated nodes, deactivated nodes, etc.) can similarly be disseminated across the network of clusters. Discovery of clusters can include establishing new adjacencies of clusters through indirectly receiving communication of an external gateway configuration. In other words, establishing adjacency can include, at a second cluster, distributing the gateway configuration of a third cluster to the first cluster and establishing adjacency between the first cluster and the third cluster. In this way the second cluster can act as an intermediary cluster. The second cluster will also previously have had the third cluster as an adjacent cluster. When performed iteratively, a full topology may be discovered.

Block S130, which includes distributing the external gateway configuration across at least a subset of nodes of the first cluster, functions in distributing pertinent information to nodes within the first cluster such that nodes of the first cluster have updated information on the gateway configuration and can connect to nodes within the second cluster (and other clusters). In this way, updated external gateway configuration can be efficiently distributed internally within a cluster. More generally, the method includes, at each cluster of the network of clusters, distributing the external gateway configuration across at least a subset of nodes. The subset of nodes preferably includes the nodes in the cluster that act as gateway nodes. The gateway configuration may optionally not be distributed to internal nodes if there are internal nodes in the cluster. In one preferred variation, the subset of nodes of the first cluster includes all nodes within the first cluster. In another variation, the subset of nodes of the first cluster may comprise anywhere between zero to all nodes within the first cluster. Preferably, the number of nodes in the at least a subset of nodes may change as desired.

The external gateway configuration preferably includes topological information. The topological information shared with the subset of nodes is preferably identical for each node. Alternatively, the topological information shared may be different for some and/or all nodes. That is, distributing external gateway configuration for each node may include sharing all of the external gateway configuration with each node of the subset of nodes of the first cluster, or may include sharing particular information with each node. In one implementation, the information shared with each node may depend on the type of node. For example, more information may be shared with nodes in the cluster that are determined to be more secure.

In another preferred variation, the desired topology may be created with security in mind, and thus minimizing the amount of information and access the first cluster has to the second cluster. In this variation, the external gateway of the second cluster chooses one node in the second cluster for each node from the subset of nodes in the first cluster. Distributing the external gateway configuration may then provide each node from the subset of nodes just the specific information required to connect to their chosen node. In one preferred example of this variation, each node in the second cluster is chosen randomly. In another example all nodes in the first cluster are told to connect to one single node in the second cluster. Alternative methods for choosing the node in the second cluster may be additionally or alternatively used (e.g., optimization and load balancing reasons may preferentially select for less "trafficked" nodes, and security and privacy may preferentially select overloading a few nodes).

Block S140, which includes establishing a connection between all clusters from the network of clusters, functions to form a spline connection between the clusters and/or updating an already formed spline network to account for changes in the topology of the network of clusters. Establishing a connection between all clusters from the network of clusters further includes establishing a connection between the first cluster and the second cluster from the network clusters. Establishing a connection between the first cluster and the second cluster further comprises, for each node of the first cluster, establishing a single outbound connection to a select node of the second cluster S142.

It should be noted that the terms "first cluster" and "second cluster" do not distinguish any unique cluster properties, and the labels "first" and "second" are utilized only to show perspective; that is, a connection is primarily used for outbound message transmission from the first cluster to the second cluster. For preferred variations that include adjacent clusters, either cluster may be identified as a first cluster or a second cluster dependent on the perspective of a connection. For example, two distinct adjacent clusters, e.g., cluster A with nodes A1, A2, and A3 and cluster B with nodes B1, B2, and B3. Cluster A may be regarded as a first cluster when looking at an outbound connection from A1 to B2, while Cluster B may alternatively be regarded as a first cluster when looking at an outbound connection from B3 to A3. Preferably, each cluster from the network of computing clusters is adjacent and has gateway connections to at least one other cluster; in which case all clusters within the method may be considered a first cluster and a second cluster.

Block S142, which includes, establishing a single outbound connection to a select node of the second cluster for each node of the first cluster, functions to establish a connection between the first cluster and second cluster. An outbound connection is preferably a gateway connection from a node of one cluster to a node of another cluster. The outbound connection is preferably used to send messages to the receiving node and/or cluster. From the perspective of the receiving node, the outbound connection is an inbound connection to the cluster. While the outbound connection is preferably used in sending messages from one cluster to another, the outbound connection may additionally support two-way communication. For example, subscription interest may be propagated from a receiving cluster to an originating cluster using such a connection. By each node establishing an outbound connection to some select node in the second cluster, block S142 may complete a spline connection between the two clusters; such that any node within the second cluster is a maximum of two steps away from any node within the first cluster, i.e., an intra-cluster hop connection and an inter-cluster full mesh connection.

For each node of the first cluster, establishing a connection from the first cluster to the second cluster S142 includes selecting a select node from the second cluster. In preferred variations selecting a select node for each node in the first cluster is performed distinctly for each node in the first cluster. That is, each node in the first cluster may connect to a second cluster node independent of all other first cluster nodes. A node may be selected using a variety of approaches. In one variation, a node may be selected randomly from the second cluster. In one variation, a node may be selected according to some sequential ordering of nodes in the second cluster. In one variation, a node may be selected by load balancing across nodes of the second cluster.

As the nodes can be selected independently, two nodes of the first cluster may establish outbound connections to the same node of the second cluster. Similarly, two nodes of the first cluster may establish outbound connections to different nodes of the second cluster. To further characterize the connections of a first and second cluster, consider the first cluster including a count of N nodes. In this example, establishing a single outbound connection to one node of the second cluster for each node of the first cluster will include establishing N single outbound connections from the nodes of the first cluster to the nodes of the second cluster. Additionally, wherein a second cluster with M nodes, every node of the first cluster has exactly one outbound connection and each node of the first cluster has zero to M inbound connections from the second cluster. In this example, there may be P adjacent clusters to the first cluster and a total sum of K nodes in the P adjacent clusters. In this way, establishing a connection between all clusters from the network of clusters comprises establishing P outbound connections from the first node and zero to K inbound connections to the first node.

In some preferred variations, selecting a select node includes selecting a URI from the external gateway configuration and initiating an outbound connection. Selecting a URI from the external gateway configuration functions to identify and select a node from the second computing cluster. Selecting a URI from the external gateway configuration may occur randomly, wherein each URI is selected randomly. Random selection may allow a node in the second cluster to have anywhere between multiple inbound connections to zero inbound connections.

Alternatively, selecting a URI may be a biased selection, or a biased random selection (e.g., randomly choosing a URI that has not been chosen by too many other nodes). Biased selections may be based on streamlining connectivity (e.g., increase the likelihood of connection if a specific node in the first cluster sends messages regularly to a specific node in the second cluster), balancing traffic (e.g., minimize connections to a node in the second cluster that has more traffic and/or connections than other second cluster nodes), connection recommendations received from the second cluster, and/or for any other reason. Depending on how connections are chosen, multiple nodes in the first cluster may choose the URI for the same node in the second cluster (e.g., through random or biased connections).

In preferred variations, the URI is a Universal Resource Location (URL) but may alternatively be any type of cluster/network address that can enable the locating and the formation of a connection from the first cluster to the second cluster. In some variations selecting a URI from the external gateway configuration additionally includes selecting the URI password. The URI password may be required to connect to the node of the second cluster.

Block S142 may additionally include initiating an outbound connection, for each node from the first cluster. Initiating an outbound connection functions to establish a connection between a node from the first cluster and a node in the second cluster.

In one variation, after initiating an outbound connection, the second cluster target node (e.g., the receiver node) can message the connecting origin node from the first cluster with a message that recommends, or otherwise triggers, connecting to a different target node. For example, if a node is somehow selected by most, or all, of the first cluster nodes, then the targeted node may respond to initiating an outbound connection, by requesting inbound connections from the node in the first cluster to connect to another node in the second cluster. In the variation where the first cluster node receives the external gateway configuration information about only a single second cluster node, distributing the external gateway configuration S130 may be required in giving the first cluster node the appropriate information, prior to the first cluster node initiating an outbound connection again.

In some variations, initiating an outbound connection may further include the second cluster utilizing the connection to the first cluster to also initiate a connection back to the first cluster. That is, a second cluster node with an inbound connection may use that inbound connection as its own outbound connection to the corresponding first cluster node such that a connection may be outbound and inbound. Alternatively, the second cluster node may use information from the inbound connection in creating a distinct outbound connection to the same first cluster node. In other preferred variations, establishing a connection is performed independently in each direct between two clusters.

As discussed previously, selecting a URI from the external gateway configuration will preferably initiate all nodes of the first cluster to establish outbound connections to the second cluster. As mentioned before, for preferred variations, establishing a connection S140 does not place any restrictions on the nodes of the second cluster. For this reason, establishing a connection S140 generally establishes outbound connections for all nodes within a cluster, but may or may not establish inbound connections for any particular node within a cluster.

The method may additionally include establishing a connection with a client through one of the clusters. Establishing a connection with a client functions to interface with one or more client devices. Client devices can preferably be integrated with the computing resources of the clusters by connection to at least one node of a cluster. Clients may connect to a node of a cluster using a substantially similar approach of having a randomly specified URL used in connecting to one of the nodes of a cluster. A client may alternatively connect to a node of a cluster in any suitable manner. Any suitable number of clients can connect across any suitable computing cluster(s).

During execution of the method, external gateway configurations may change as the topology of the clusters change. The method and method sub steps may further include updating the system topology. Updating the system topology may include removing dead connections and initiating new outbound connections based on the external gateway configurations.

With regards to creating and updating the system topology, blocks S110-S140 may occur concurrently between multiple clusters and multiple nodes. Blocks S110-S140 may occur concurrently between: distinct first clusters and distinct second clusters, distinct first clusters and a single second cluster for all the first clusters, a single first cluster, and multiple distinct second clusters, and/or any combinations of first and second clusters. Additionally, and/or alternatively, the first cluster for a single implementation of block S120 may concurrently be the second cluster for another implementation of block S120. In one preferred example, where a two directional connection is formed between a cluster one and a cluster two; cluster two is the second cluster for cluster one (which is the first cluster), while concurrently cluster one is the second cluster for cluster two (which is also a distinct first cluster).

Block S150, which includes managing communication over the system topology, functions to enable rapid exchange of data between network clusters. The data may be any suitable type of data. Preferably, the data comprises communication data, which may be in any language, deterministic or stochastic. Generally speaking, the data comprises information, i.e., content with non-zero Shannon entropy. In preferred variations, communication data is actual communication that can be in any written or computer language. The communication may be a discrete data communication such as a message, but the communication may alternatively be a data stream such as a media signal. Communication data may be encrypted or not encrypted. Managing communication over the system topology S150 preferably includes, at a receiver node, propagating a subscription interest S152, and at an origin node from the first cluster, transmitting communications over the connection according to the subscription interest S154; wherein the origin node is the source of the data communication to the receiver node.

Blocks S152 and S154 are preferably performed repeatedly across all adjacent clusters wherein an originating cluster (e.g., cluster of the node(s) with an outgoing connections) can operate substantially similar to that of the first cluster described herein, and a receiving cluster (e.g., cluster of the node(s) that serve destination of the outgoing connections) can operate substantially similar to the second cluster described herein. A node of the originating cluster will generally be transmitting communications over outbound connections to a node of the receiving cluster, and a node at the receiving cluster will be propagating subscription interest back to the originating cluster. In other words, the cluster of any origin node that has an outgoing connection to a receiver node can act in a similar manner to the first cluster. Similarly, the cluster of any receiver node, that has an inbound connection, may in a similar manner to the second cluster. Thus, first cluster and second cluster are used herein as descriptive labels to convey perspective and show direction of a connection. The terms first cluster or second cluster do not convey or imply any additional properties of either cluster.

Block S152, which includes propagating a subscription interest at a receiver node from the second cluster, functions to convey the receiver node's interest (or lack of interest) in communications from a subscription interest. Preferably, propagating a subscription interest S152 conveys the receiver node's interest (or lack of interest) to the origin node, or to some point in between the origin node and the receiving node.

Propagating a subscription may be initiated by determining the subscription interest at the receiver node. In one variation, determining the subscription interest is determined in response to a received communication. For example, a received communication may be processed to assess if the receiver node and/or a node within the cluster of the receiver node (i.e., the receiving cluster) have any interest. If there is no interest, a subscription interest may be propagated that suppresses receipt of similar communications. In another variation, determining the subscription interest is based on internal determination that is generated from within the receiving cluster of a subscription interest. For example, a node may declare and share an interest or disinterest for communications with a particular subject and/or account.

Propagating a subscription interest S152 will preferably result in updating a record of subscription interests of the node at the origin node. Accordingly, propagating a subscription interest S152 propagates the receiver node's interest to the origin node. The subscription interest is propagated using the receiver node's inbound connection(s). In other words, subscription interest is sent back to the origin node using the outbound connection of the origin node (i.e., an inbound connection of the receiving If the receiver node does not have an inbound connection, the subscription interest is preferably distributed internally within the cluster of the origin node. Alternatively, the subscription interest may be communicated to the origin node and/or the cluster of the origin node in any suitable manner.

Block S154, which includes, at an origin node of the first cluster, transmitting communications over the connection according to the subscription interest, functions in sending communication(s) between nodes. Transmitting communications over the connection preferably includes: at the origin node, transmitting the communication over the single outbound connection of the origin node of the first cluster to a receiver node of the second cluster and transmitting the communication within a full-mesh topology of the second cluster. The receiver node in this instance is the node the origin node has an outbound connection to. Once the communication is received at the receiver node, the communication may in some instances be internally communicated to a node of the second cluster. As discussed above, the communication at most makes two hops: one between clusters, over the outbound connection, and possibly a second hop internally, over the full mesh connection within the second cluster.

Although a communication may originate at the origin node, in some cases the communication originates from a client connected to the origin node. In the same manner, the receiver node may not be the actual interested party to receive a connection, but a client connected to the cluster of the receiver node. Thus, although subscription interest of a receiver node is discussed, an interest may be due to a subscription request, at least initially, from one or more clients connected to the receiver node.

All communications from an origin node preferably have a number of properties that could relate to a subscription interest. The subscription interest functions to enable the receiver node to show interest (or lack of interest) in communications from the origin node. In preferred variations, the subscription interest may have defining parameters, for the receiver node to show express interest and/or disinterest.

The subscription interest may have multiple subscription parameters that the receiver node may show interest, or no interest for. The subscription parameter may enable the receiver node to specify specific of the types of communications that there is some measure of interest, which may include positive or negative interest. Any parameter that may describe a subscription may be utilized, but preferably the subscription parameter is general enough such that the parameter may encompass most or all subscription interests. Examples of possible subscription parameters include: subject, account, language, communication length, geographic source, and/or other possible parameters. In one preferred example, the subscription interest has a "subject" subscription parameter, wherein the subject describes the subject property or properties of communications where there is some form of interest. In a second preferred example, the subscription interest has an account subscription parameter, wherein the account can be matched to the account property of a communications. For example, a subscription may subscribe or suppress communications related to a particular account. In one preferred implementation, the subscription interest parameters include both subject and account. That is, a receiver node may show interest (or no interest) for a subject-specific subscription or an account-specific subscription.

The subscription interest may additionally have a type property. The subscription interest type functions to define the default action for transmitting communications over the connection according to the subscription interest S154. Additionally, the subscription interest type may function to define the action for transmitting communications once an interest (or lack of interest) is propagated by the receiver node. In preferred variations, the subscription interest type includes a follow-type subscription interest and an unfollow-type subscription interest. Alternatively, the subscription interest type may be any other desired type.

The follow-type subscription interest functions to whitelist communications for which there is express interest. A follow-type subscription interest may be used to limit communications to those matching interest properties of the subscription interest. Communications of follow-type subscription interest can be used for "interest only" subscription, and may be propagated by nodes that have shown interest in that subscription interest, (i.e., have made a follow request). A follow-type subscription interest can be used in an interest-only mode where for the first cluster the default action is to only transmit communications to the receiver node when the receiver node has made a follow-type subscription. In some instances, the subscription interest may be associated with communications by a specified subject or an account, wherein the follow request may be a subject-specific follow request or an account-specific follow request.

The unfollow-type subscription interest functions to blacklist or suppress communications for which there is an express disinterest. An unfollow-type subscription interest is preferably used when a node/cluster wants to suppress a type of communication or, in other words, when a node/cluster does not want to receive communications of a particular interest. The unfollow-type subscription interest can be used in an optimistic mode of communicating, wherein communications are transmitted by the origin node by default except for those communications that have been "unfollowed" (i.e., that match an unfollow-type subscription interest). In some instances, the subscription interest may be associated with communications by a specified subject or an account, wherein the unfollow request may be a subject-specific unfollow request or an account-specific unfollow request.

Figure 5:
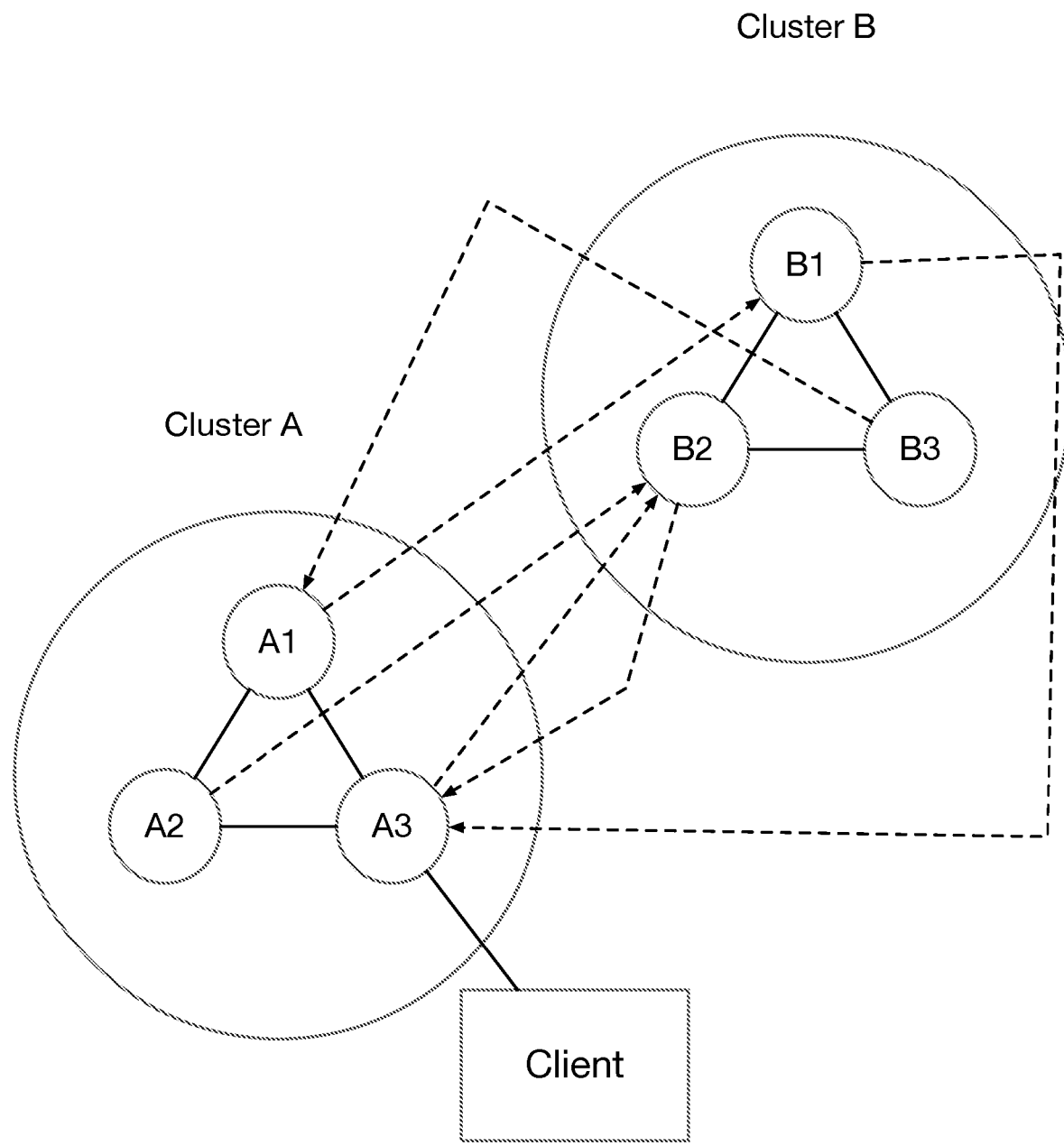
FIG. 5 is a schematic representation of two adjacent clusters.

In some preferred variations, for a specific subscription interest, the subscription interest type may be different between each origin node and each receiver nodes. For example, looking at the two adjacent clusters in FIG. 5, the subscription type may be optimistic between an origin node A1 in cluster A and a receiver node B1 in a cluster B, but interest only between origin node B1 and a receiver node A3 in a cluster A. In this example, communications would by default be transmitted to B1 unless an unfollow-type subscription interest is propagated by B1, and communications would be transmitted to A3 only if a communication matches a follow-type subscription interest propagated by A3.

Propagating a subscription interest S152 and transmitting communications over the connection according to the subscription interest S154 may be used in an interest-only mode or an optimistic mode in some variations.

Figure 6:
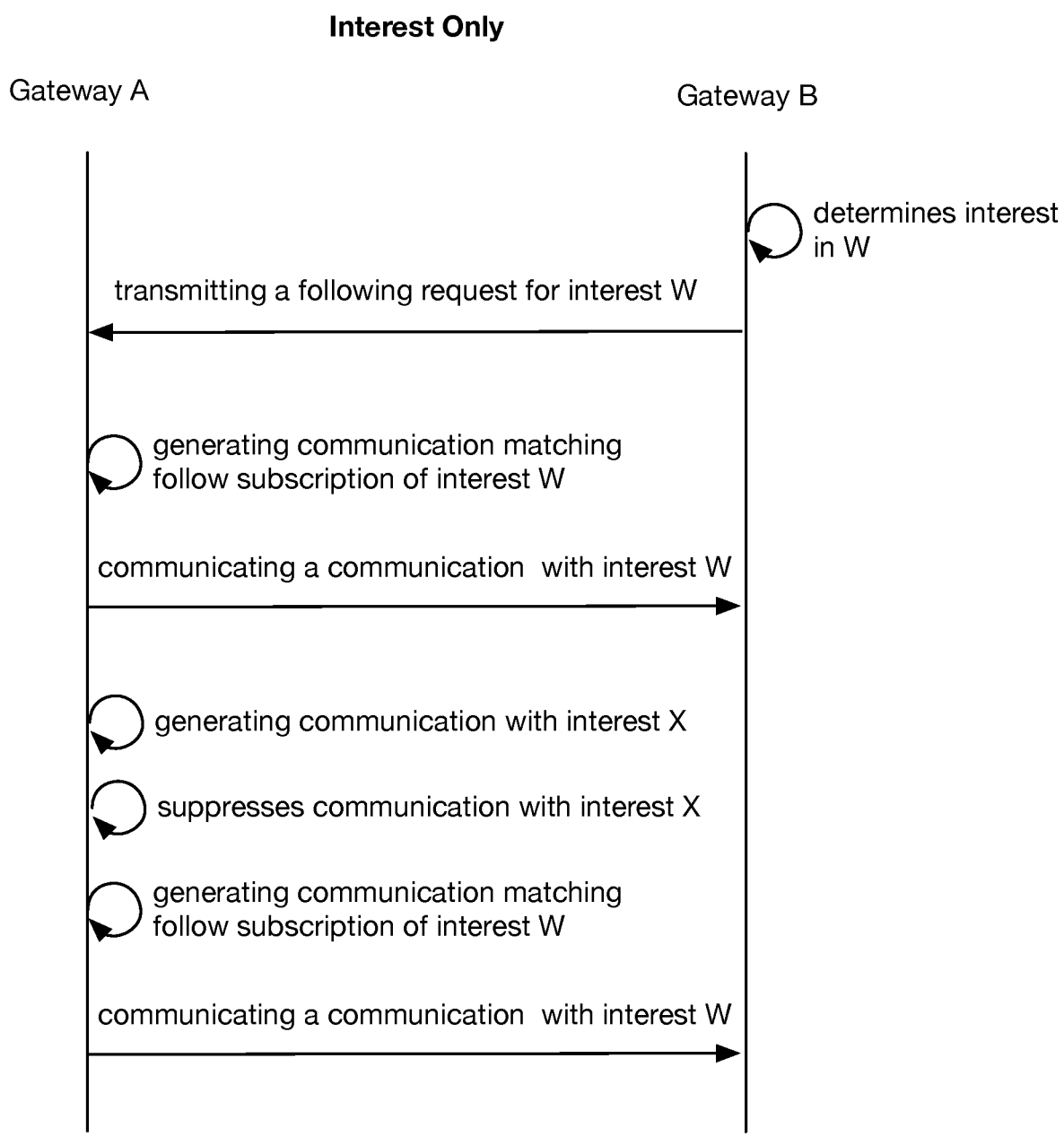
FIG. 6 is a flowchart representation of communicating in an interest-only mode.

In an interest-only mode, as shown in FIG. 6, communications are only transmitted for communications corresponding to an expressed interest from the receiver node (e.g., a follow-type subscription has been propagated). Accordingly, at the receiver node of the second cluster, propagating a subscription interest when in an interest-only mode comprises determining a follow-type subscription interest and communicating the follow-type subscription interest to the origin node; and wherein, at the origin node of the first cluster when in an interest-only mode, transmitting communications over the connection according to the subscription interest comprises transmitting only communications that correspond to an interest expressed in the follow-type subscription interest.

Figure 7:
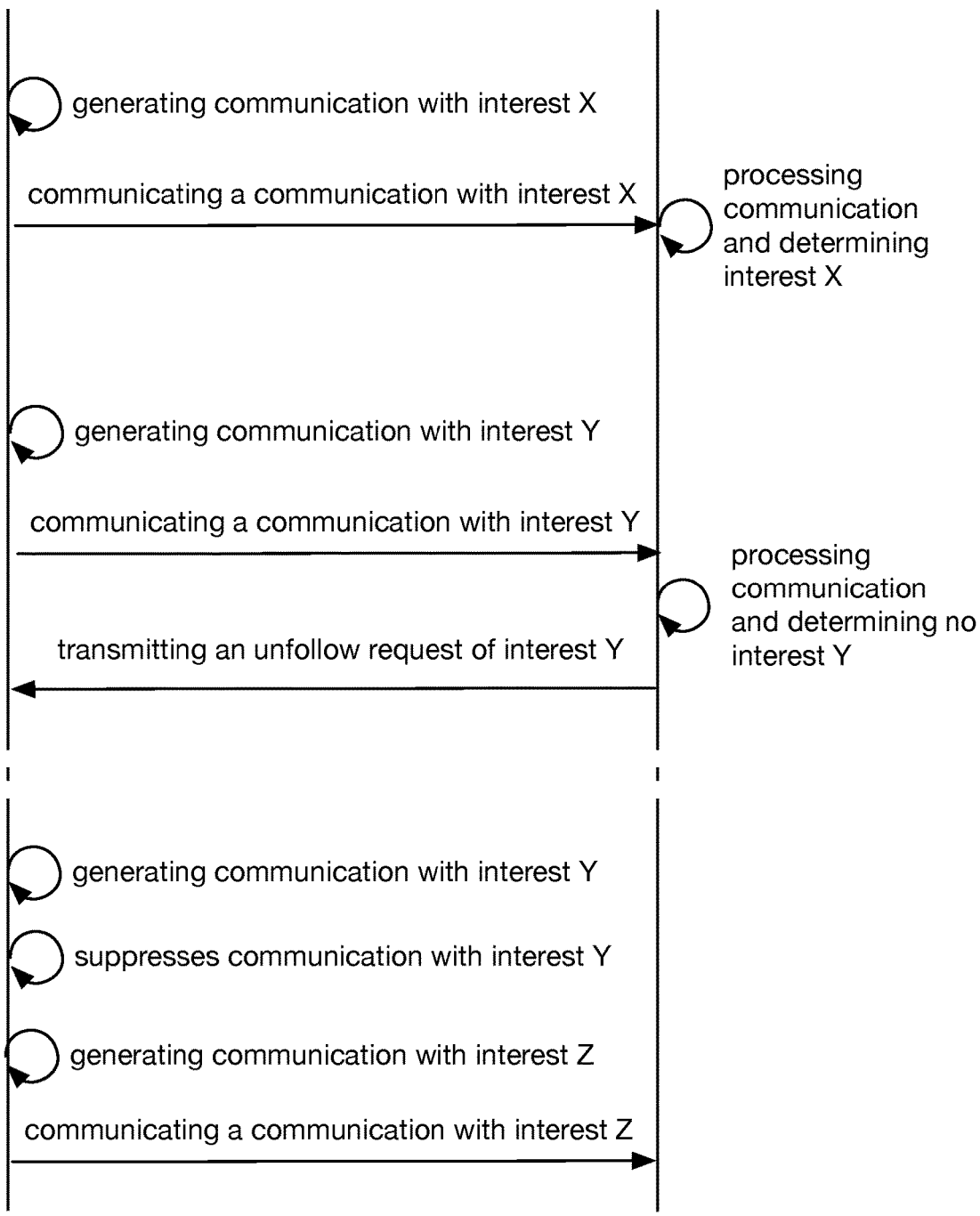
FIG. 7 is a flowchart representation of communicating in an optimistic mode.

In an optimistic mode, as shown in FIG. 7, communications are transmitted by default (e.g., "optimistically" defaulting to sending communications expecting there to usually be interest) except for communications corresponding to an expressed disinterest (e.g., an unfollow-type subscription interest has been propagated). In other alternative modes, follow-type subscription interests and unfollow-type subscription interests may be used in combination. Accordingly, at the origin node of the first cluster when in an optimistic mode, transmitting communications over the connection according to the subscription interest comprises transmitting all communications over the connection except those corresponding to an interest in an unfollow-type subscription interest; and wherein, at the receiver node of the second cluster when in an optimistic mode, propagating a subscription interest comprises determining an unfollow-type subscription interest in response to a received communication and communicating the unfollow-type subscription interest to the origin node.

Figure 8:
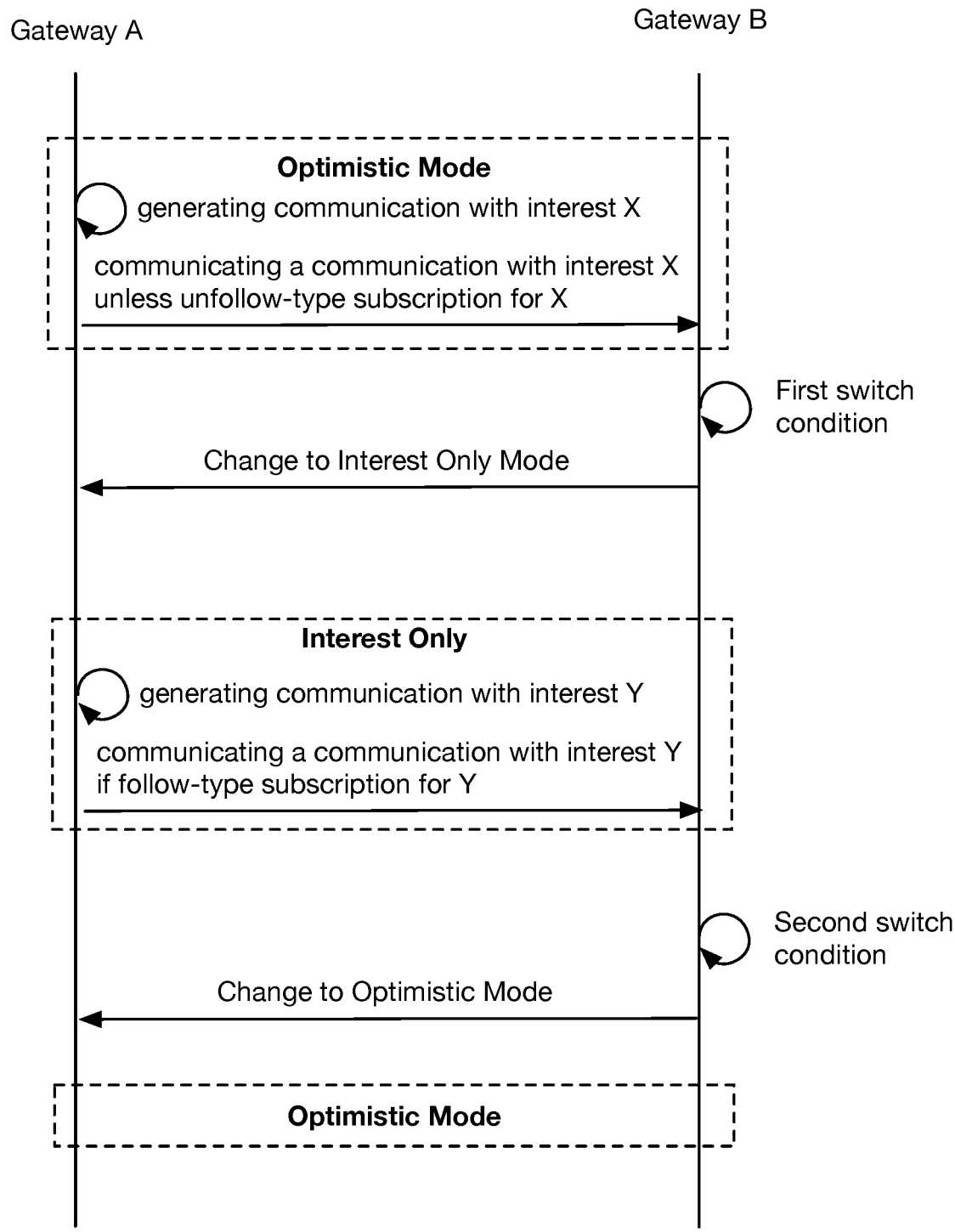
FIG. 8 is a flowchart of representative switching between communication modes.

In one preferred variation, propagating a subscription interest S152 and transmitting communications over the connection according to the subscription interest S154 will operate in an interest-only mode or optimistic mode and will additionally dynamically switch modes as shown in FIG. 8. Switching between interest-only mode and optimistic mode functions to select a mode that more appropriately suits the type of traffic between two nodes. Switching can be used to change to a mode that minimizes unnecessary or excessive traffic. For example, switching away from optimistic mode when most of the traffic is ultimately unfollowed or not desired by the receiver node.

In a preferred implementation, two nodes initiate in an optimistic mode and may switch to an interest mode. The two modes may additionally switch back to an optimistic mode and switch any suitable number of times. Alternatively, two nodes may initiate in interest-only mode.

Accordingly, when in an optimistic mode and operating as described above, the method may further include: for an outgoing connection from the origin node and the receiver node, detecting a first switch condition at the receiver node and changing to an interest only mode.

In enabling changing to optimistic mode, the method may further include, when in the interest mode: detecting a second switch condition at the receiver node and changing to the optimistic mode.

The first switch condition may alternatively be described as an interest-only switch condition—a condition prompting a change to interest-only mode. The second switch condition may alternatively be described as an optimistic switch condition—a condition prompting a change to optimistic mode. Multiple and different switch conditions may be monitored. When switching between modes, the follow-type subscriptions and the unfollow-type subscriptions are preferably preserved such that previous following requests and unfollowing requests can be observed without needing to communicate those.

The switch condition could be any desired type of condition or event. In some instances, the first and second switch conditions are each based in part on the number of subscription interests that are propagated and the number of communications that are transmitted. A switch condition may reveal when a large volume of traffic is unnecessary. A threshold may be set such that when a metric related to such a condition is met then it switches to a different mode. The first switch condition (an interest-only switch condition) may be based on when there is a large volume of traffic being sent over that the receiver node does not have any interest. Additionally, the receiver node, in response, may also be sending a large volume of unfollow-type subscriptions. Switching to interest-only may lessen traffic to just the communication to which the receiver node has interest. The second switch condition (an optimistic switch condition) may be based on when there is a large volume of follow-type subscriptions being sent over. If the receiver node is constantly sending updates on follow-type subscriptions, it may be less traffic to switch to an optimistic mode.

Switch conditions may additionally or alternatively be based on other suitable properties. Threshold modeling may be used to adjust various thresholds to adapt switch conditions to the particular nodes, clusters, and/or the network of clusters. Statistical modeling or deep learning models may also be used for the network of clusters, each cluster, and/or for each node. In this way historical patterns may be used in dynamically determining when to switch. In another variation, the time window of communication patterns may be considered in determining the switch conditions. Other examples of possible switch conditions may include: switching type during a certain time of day (e.g. nights), switching after a certain number of communications are sent, switching after receiving a certain number of subscription requests, switching once network traffic reaches a threshold, and/or other suitable conditions.

In preferred variations, the receiver node determines when a switch condition has been met and prompts communicating a mode change to the origin node wherein the use of the subscription interest type changes. For example, if the receiver node receives too many communications from the origin node that no node in the second cluster has interest, while in optimistic mode, propagating the subscription interest S152 preferably includes propagating a "switch to follow-type" request to the origin node.

Propagating a subscription interest S152 may be due to a client subscription. When a receiver node receives a subscription from a client connection; at the receiver node, the subscription may be stored on the gateway. Having a subscription for a specific subject interest preferably leads to the receiver node to determining interest for the subscription interest.

Propagating a subscription interest S152 is preferably dependent on the parameters of the subscription interest and the type of subscription interest. For the optimistic communication example, propagating a subscription interest S152 may include propagating an unfollow request from the receiver node that is not interested in the subscription interest. For the interest only communication example, propagating a subscription interest S152 may include propagating a follow request from the receiver node that is interest in the subscription interest.

In optimistic communication, a receiver node registering subscription interest (either from a client or from another node in its cluster) should determine if a follow request should be sent on a per inbound connection basis. If, for a given inbound connection, the receiver node had previously sent an unfollow request, it may now send a follow request. If the receiver node had not sent an unfollow request, no action is required. An origin node in the first cluster receiving a follow request through its outbound connection should clear the unfollow subscription interest of the receiving node in the event it was marked as such after transmitting unwanted communication.

In interest only communication, a receiver node registering subscription interest (either from a client or from another node in its cluster) can send a follow request to all inbound connections marked as interest only, since corresponding node(s) in the first cluster would suppress communication on any non-registered interest. When subscription interest is removed on the receiver node, an unfollow request should be sent to all inbound connections that are in interest only communication.

In one implementation, a node can assign a NUID for the subscription, then send the subscription interest through the outbound connections with the NUID as the secure identifier (e.g., SUB foo <nuid>). A NUID can function to avoid identifier collisions.

When a node receives a subscription interest from a gateway connection, the node can propagate the subscription interest within its own computing cluster. In order to differentiate, the subscription interest protocol can contain the name of the origin cluster name. A node receiving a subscription interest from a route connection can identify the intended cluster (e.g., for cluster A), lookup an outbound connection with this cluster name (if it exists) and then create a subscription and register it with a secure identifier.

As shown in FIG. 3, in cluster B, when a node processes a subscription request coming from a server that received it from its gateway (e.g., a SUB foo GSID: <nuid>:<gateway name>), this can result in creating a subscription and registering it to the list of subscriptions for the outbound gateway connection of that name. The subscription request may be a follow request or an unfollow request. For FIG. 3, it should be noted that outbound connections from nodes S1 and S3 in cluster A to cluster B have been emitted for the purpose of clarity.

Propagating subscription interest S152 can similarly occur through connections to clients. As shown in simplified FIG. 4, when a client connects to a node, a NUID can be created and sent over to the remote gateway. In the shown example, the client in Cluster A was assigned NUID1 and sent over to cluster B, where each server will have a subscription on "foo" with subscription id: NUID1. The subscription on S1/B was assigned NUID2 that is propagated to Cluster A. The figure shows a client in Cluster B sending a message on foo, connected to server S3. There was an interest on foo from client connected to S1. That interest was propagated to cluster B, so this is why S2 and S3 have a sublist that contains a SUB for foo RSID:1:1.

In one variation, interest propagation can be enhanced through reference counting. In one implementation, propagating interest can include reference counting a given subject and only sending a subscription request when the count is one and unsubscribe when the count goes down to zero. Each node in a cluster could facilitate this. For example, if s1 and s2 belong to cluster A and they have a connection to cluster B. If each node has two subscriptions on "foo", then s1 would send a subscription interest on "foo" to B once and so would s2. In the case of hierarchical interests, if there are subscriptions for "foo.1" and "foo.2" and then a subscription on "foo.>" occurred, then subscriptions on "foo.1" and "foo.2" can be suppressed and replaced with "foo.>"

Figure 4:
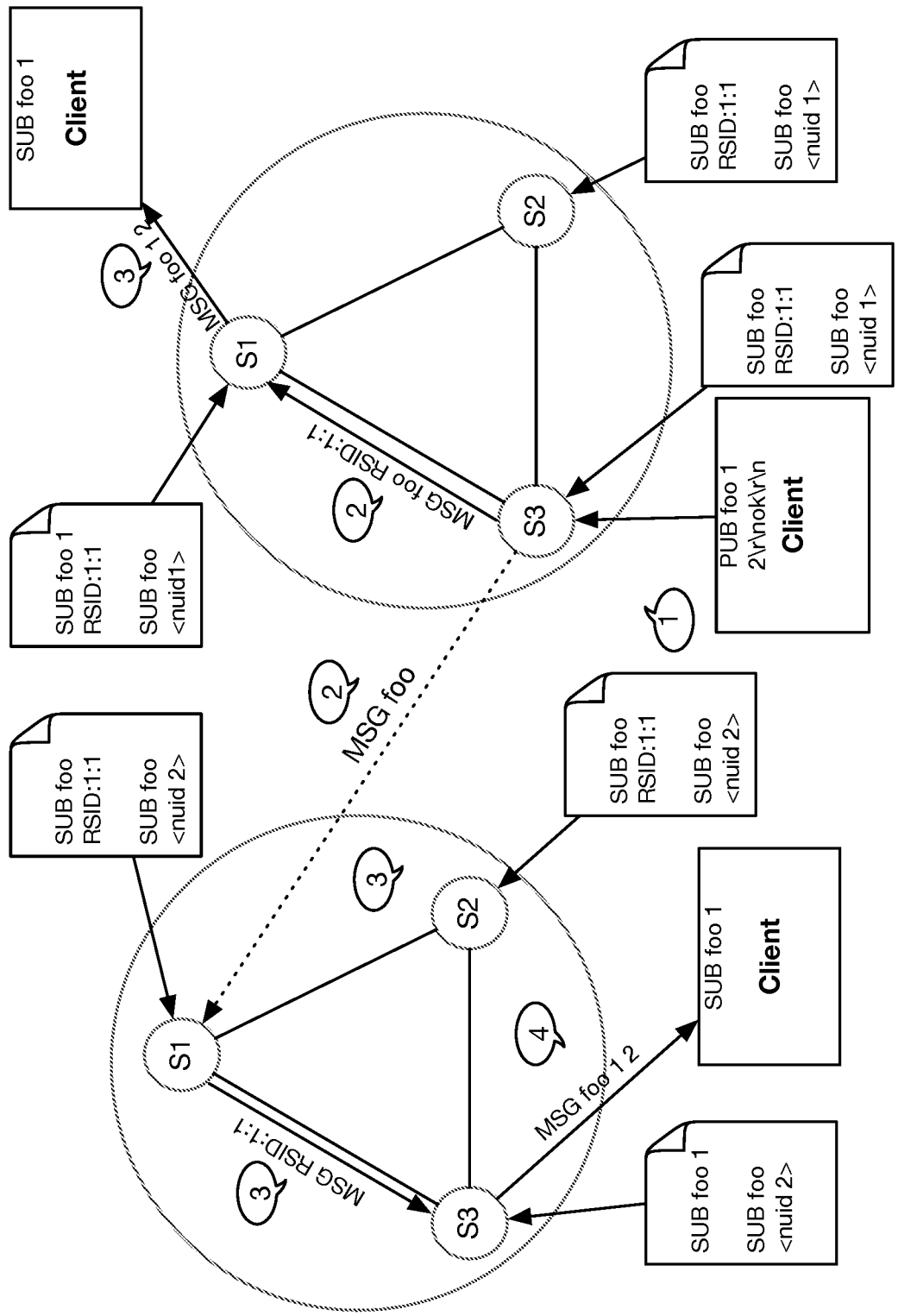
FIG. 4 is an exemplary representations of a scenario of interest propagation.

In the example of FIG. 4, since there is also a subscription interest from a client in cluster A, each node in cluster B has a subscription interest for gateway A. The same is true for cluster A because of the interest in cluster B.

When S3 receives the message from the client, S3 sends the message to the route, but also sends it to its gateway. Once S1 in cluster A receives this message from a gateway connection, S1 forward to S3 since there is a match for "foo". In one implementation, messages are preferably sent to gateways only from direct client connections. S3 will then send the message to local subscription. Since a node that receives a subscription interest from a gateway connection notifies its own cluster from the interest from the given gateway, each node can register interest for the subject associated with their outbound gateway connection for that gateway. Therefore, when a client connects to any node in the cluster and publishes a message, each node is able to directly send the message over the gateway connection, without the need to first route the message to the node that originally received the subscription interest directly from the gateway.

The method may additionally be used in subject filtering wherein the method includes communicates messages on subjects based on permissions defined in the gateway configuration. The configuration can include a permissions section where import and export permissions may be defined. An export permission can define permissions to communicate a subject to an outbound connection. For example, when a client publishes, the node can get all matching subscriptions. If the subscription is attached to a connection, then the node can send the messages through the connection if the message subject is part of (or otherwise satisfies) the export permissions.

An import permission can define permissions to receive communication on a particular subject. For example, when a message arrives through an inbound connection, the node can check if the subject of the received message is part of (or otherwise satisfies) import permissions. The message is preferably processed if it satisfies the import permissions and is preferably dropped or discarded otherwise.

3. System

Figure 9:
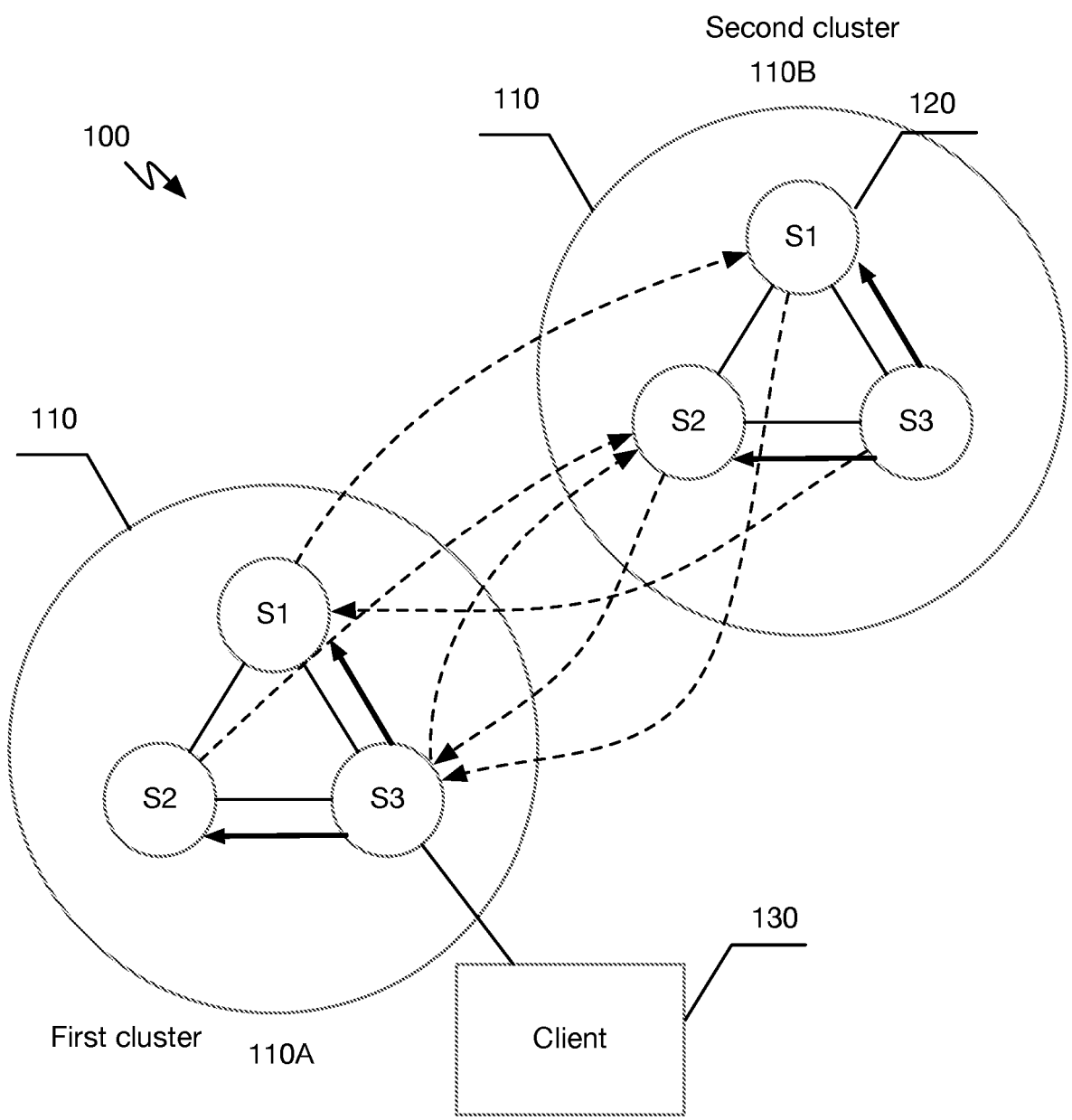
FIG. 9 is a schematic representation of a system of a preferred embodiment.

As shown in FIG. 9, a system for a distributed computing architecture of a preferred embodiment can include a network of clusters 100. The network of clusters will generally include a plurality of clusters 110 with at least two clusters 110A and 110B. Each cluster includes a set of nodes 120. The set of nodes 120 within each cluster 110 can be internally interconnected in a full mesh network topology. That is each node 120 preferably has a bi-directional connection with every other node 120 within the same cluster 110. Additionally, each node 120 from the set of nodes has one outgoing connection to a node 120 in an adjacent cluster 110. More specifically, each node 120 from the set of nodes 120 has exactly one outgoing connection to one selected node 120 of each adjacent cluster 110.

The system is preferably used in implementing the method described herein. Accordingly, a plurality computing clusters preferably include computer-readable instructions with configuration to: establish a connection between all clusters from the network of clusters, where for a given first and second cluster, establish a single outbound connection to a select node of the second cluster for each node of the first cluster; and manage communication over the system topology where at a given receiver node of the second cluster there comprises configuration to propagate a subscription interest, and at an origin node of the first cluster there comprises configuration to transmit communications over the connection according to the subscription interest. The system and elements of the system can include configuration to perform any of the processes described herein.

Within the system, gateway connections (i.e., outbound connections) are used in connecting one or more clusters 110 together. An outbound gateway connection is preferably used to transmit messages from an origin node of an originating cluster to a receiving node of a destination cluster. The gateway connection preferably includes sending messages from the origin node to the receiving node. In some variations, communications (e.g., subscription interest updates and configuration information) can be transmitted from the receiving node to the origin node. In some variations, connections between clusters 110 may be used in the formation of super clusters from a collection of smaller clusters. Internal cluster connections preferably connect servers (or nodes 120) of a cluster 110. Gateway connections are used in connecting clusters 110. Nodes of a cluster may act as a gateway node or an internal node. Gateway connection protocols and cluster connection protocols preferably listen on different ports. Gateway nodes preferably share node membership of clusters and information on external clusters. The network of clusters 100 preferably does not form a full mesh and are bound by unidirectional connections. In effect the gateway connections can have a potential benefit of reducing the number of connections required between servers and enhancing the interest graph propagation.

The full mesh internal connections of a cluster can be characterized as totaling $N(N-1)/2$ where N is the number of nodes in the cluster. The outbound connections of a cluster can be characterized by the summation of $Ni(M-1)$ where Ni is the number of nodes in a cluster i, and M is the total number of adjacent clusters in the network. Inbound connections for a gateway i is the summation of $U-Ni$ where U is the sum of all gateway nodes in all gateways, and N is the number of nodes in a gateway i. It works out that both inbound and outbound connection counts are the same.

These conditions may be restated for a particular cluster. In considering the connection between a first cluster and a second cluster, assume the first cluster 110A has a count of N1 gateway nodes and the second cluster 110B has a count of N2 gateway nodes. In this case, there would be N1 single outbound gateway connections from the gateway nodes of the first cluster to the gateway nodes of the second cluster 110B, where every gateway node of the first cluster has exactly one outbound connection. Additionally, each gateway node of the first cluster can have zero to N2 inbound connections from the second cluster. In considering all the clusters, assume there are P clusters connected to the first cluster, and the P clusters have a sum total of K nodes. Then for any given first node in the first cluster there are P outbound connections from the given node and zero to K inbound connections to the first node.

The system can be used in execution of a variety of computing systems or services, particularly for services that benefit from distributed computing. The system functions as a framework that facilitates the underlying communication network, connections, and connection orchestration. Additionally, the system facilitates efficient communication between networks of different topologies.

The cluster 110 of a preferred embodiment functions to perform regional computing operations. The system will have at least one cluster 110, and in preferred variations, the system will include at least two clusters 110A and 110B. Each cluster 110 includes a set of nodes 120 comprising at least one node 120.

The system generally includes a plurality of clusters 110, although the system may include only a single cluster 110 (i.e., a set of clusters 110 comprising at least one cluster 110). The set of clusters 110 that comprise the system can dynamically change. New clusters 110 can be added, clusters 110 (and their internal nodes 120) can update and change their internal topology, and/or computing clusters 110 may be deactivated, disconnected or otherwise removed from the system. The system preferably adapts to changes in the cluster topology. In this manner, each cluster 110 may connect and digitally interact with any suitable number of clusters 110. Additionally, each cluster 110 may connect to a client device or resource. As described herein, information regarding changes in a cluster 110 (e.g., addition of a new cluster 110 or removal of a cluster 110) is propagated through the network of clusters 100.

The clusters 110 may exist in physically different computing infrastructures. For example, a first cluster 110A may be located in a first cloud computing platform (e.g., Amazon cloud) and a second computing cluster 110B in a second cloud-computing platform (e.g., Google cloud). The clusters 110 may additionally, or alternatively, exist in distinct geographical locations (e.g., different regions of a country or in different continents). For example, a first cluster 110A may be in a first region and a second cluster 110B in a second region. The first cluster 110A may, or may not, have a direct connection to the second cluster 110B. This may require the first cluster 110A to initially connect to the second cluster 110A through one or more intermediary clusters 110. Once the first cluster 110A has connected to the second cluster 110B, through intermediary computing clusters 110, the first cluster 110A is preferably includes configuration to, upon detection of updated cluster configuration indicating the second cluster 110, make a connection to the second cluster 110B. In one variation that includes a third cluster 110C, a node 120 in the first cluster 110A connects to a node 120 in the second computing cluster 110B via the third cluster 110C. After the initial connection through the third cluster 110C is generated, the first cluster 110A may create a direct connection to the second cluster 110B. Once the first customary server has created the connection between both clusters 110, the first cluster 110A does not require the assistance of an external source (e.g., DNS server) to find and/or connect to the second cluster 110B.

The cluster 110 preferably includes a set of nodes 120. The nodes 120 from the set of nodes 120 may be substantially homogeneous types. That is, each node 120 may serve a similar or identical role within an application or service. Alternatively, nodes 120 may be heterogeneous, wherein nodes 120, or groups of nodes 120, are of different type, and/or serve different roles within applications and services. For example, a cluster 110 may include multiple computing resource nodes 120 that perform different roles within an application or service. Each node 120, from the set of nodes 120, functions to perform some operation and/or execute some data communication. A node 120 could be any suitable processing device or resource, such as resources that can be used within a cloud deployment. A node 120 is preferably a server executing on a computing resource or virtual machine. In one variation, each node 120 acts as a gateway node that has outbound connections to adjacent clusters 110. In some variations, however, a cluster 110 may include internal nodes, which are nodes without gateway access. Herein, nodes 120 are generally described as if they are gateway nodes, however clusters are not limited to only having gateway nodes.

In preferred embodiments, the system maintains and updates different topologies within and between clusters 110. These different topologies facilitate communication while minimizing data overhead. In preferred variations, the set of nodes 120 within each cluster 110 have a full mesh topology. That is, all nodes 120 within the cluster 110 have at least one connection to every other node 120 within the cluster 110, as shown by the solid line connections between the nodes in FIG. 9. The full mesh topology enables each node 120 to directly communicate with any node 120 in the same cluster 110 without relaying communication through an intermediary node 120, making all intra-cluster communication direct between two nodes 120 (i.e., full mesh communication). In alternative variations, the set of nodes 120 may have a different topology (e.g., a central node 120 that all other nodes 120 connect to). In preferred variations, the system will generally include full mesh clusters 110 but may incorporate, create and/or connect to clusters 110 with other alternative intra-cluster topologies. In one example, the system connects to a cluster 110 that is managed externally, and thus has any arbitrary topology.

Each node 120 within a cluster 110 may additionally have at least one outgoing connection to one node 120 in an adjacent cluster 110. For any given cluster 110 with multiple adjacent clusters 110, each node 120 within the given cluster 110 has one outgoing connection to every adjacent cluster 110. In preferred variations each node 120 has exactly one outgoing connection to a node 120 in each adjacent node 120. Setting exactly one outbound connection from each node 120 within a cluster 110 to a node 120 within an adjacent cluster 110 creates a topology wherein each node 120 within a cluster 110 has N−1 outbound connections. Nodes 120 of the other clusters 110 will similarly have outbound connections to adjacent clusters 110 and so each node 120 within a cluster can also have zero to N−1 inbound connections, where N is the number of clusters 110.

Although each node 120 has an outbound connection to an adjacent cluster 110, each node 120 may not necessarily have any inbound connections from the adjacent cluster 110.

A node 120 may, in some cases, have no inbound connections. In a similar way, a node 120 may have multiple inbound connections from nodes 120 of a particular adjacent cluster 110. In some variations, the outbound connections preferably connect to a node 120 by randomly selecting a node 120 of the targeted cluster 110. This random selection can function to minimize the amount of state that has to be managed and coordination that has to happen for initiating an outbound connection. This random selection, however, may mean one node 120 will have multiple inbound connections and another node 120 has no connections. Selection may alternatively be based on some ordered sequence of node selection, load balancing at the time of selection, and/or using any suitable approach to node selection. In one variation, a node 120 may use one of the inbound connections as its outbound connection to the other cluster 110. Similarly, it is possible that an outbound connection of one node establishes a connection to a node from which an inbound connection is also received.

As portrayed in the example of FIG. 9, comprising of two clusters 110 (first cluster 110A and second cluster 110B), wherein the first cluster 110A is adjacent to the second cluster 110B, and each cluster 110 contains three nodes 120 (server 1, server 2, server 3); any arbitrary server in the first cluster 110A may send a message to an arbitrary server in the second cluster 110B in a maximum of two hops and a minimum of one hop. For example, S3, in the first cluster 110A, can send a message to S2 in the second cluster 110B in a single hop; and to S1 and S3 in the second cluster 110B, in two hops.

A cluster 110 can connect to a second cluster 110B through one of the nodes 120 in the cluster 110. In one preferred variation, a connecting node 120 may have an array of Uniform Resource identifiers (URIs) to reference a cluster 110 with a name. There may be a single reference URI or more specifically a Uniform Resource Locater (URL) but there may alternatively be multiple URIs such as in the exemplary connection configuration of a node 120 shown in FIG. 2. As one alternative, a name may not be needed for the cluster 110. A node 120 may obtain the URL(s) from a DNS server, or from some alternate name server, or obtained the URL in some other way.

Once a connection is initiated between the connecting node 120 and to a remote cluster 110, each server on the connecting cluster 110 will then also initiate an outbound connection to the remote cluster 110 and create an adjacency topology. This is the connection that will be used to send messages to the computing cluster 110.

As mentioned previously, in preferred variations, the topology of inter cluster 110 topology expands through external communication. A cluster 110 may additionally create new adjacencies that are found or added to the system through various forms of system topology "gossip". A new cluster 110 can be found through address services (e.g., DNS), external contact (e.g., message from external cluster 110), or information received from other clusters 110 (e.g., gossiping). For example, through gossiping a cluster A may initially make a connection to a cluster B through an intermediary cluster C. Once this initial communication is set up, cluster A and cluster B preferably build a direct communication by creating an adjacency between them.

Outbound and inbound connections are preferably TLS (Transport Layer Security) connections but alternatively the connection could be another type of application layer connection or any suitable data connection channel. Herein, an outbound connection characterizes a communication channel for data transfer to a destination node 120. An inbound connection characterizes a communication channel on which data is received from a source node 120. For example, node X in cluster A can make an outbound connection to node Y in cluster B. From the perspective of node Y, node Y has an inbound connection from node X on which node Y receives communication from node X.

The system can further include or be connected to clients 130 that utilize the system topology. Clients 130 can be described as consumers or elements interfaced with by the system. The system preferably interfaces with clients through data connections at one, or multiple nodes 120, of computing clusters 110. In some variations, a client 130 may not be part of the system. Alternatively, some implementations may include client devices as part of the system. A DNS, a client library, or another mechanism may be used in coordinating connecting to a node 120 from a client 130. In one variation, a client library can coordinate collection of computing cluster configuration information and the random selection of a node 120 from the computing cluster 110. Clients are preferably cluster-aware such that they can be updated with cluster information such that they can similarly update in how they connect.

The system preferably includes optimization mechanisms, which can modify the system topology. For example, a single node 120 or server of a cluster 110 may become overloaded with traffic (e.g., due to popularity of communication, and/or all random inbound connections were made to a single server). In this example the system topology may modify connections such that there are fewer inbound connections on the overloaded server. The system will preferably move those inbound connections to other servers within the cluster 110 to maintain connections with other clusters 110. In another example, where there is significantly more intra-cluster communication between two specific servers in adjacent clusters 110. The system may modify inbound communications such that the two specific servers are directly connected to minimize traffic.

Optimization of the topology may additionally take into account the location of servers within a cluster 110. Intra-cluster connections can be prioritized between servers that are physically closest to each other. Closer connections may optimize the speed of communication. Preferably, the network of clusters is aware of their physical location and latency between clusters and/or nodes, and managing communication over the system topology can include incorporating physical location in optimizing communication between clusters. For example, if a cluster were to go down, the cluster preferably has latency information to redirect to the appropriate cluster.

The topology of the system may additionally be optimized for security. In one security example. To increase the security of a specific internal server of a cluster 110, the cluster 110 may direct all inbound connections to other internal nodes 120. This topology would still enable communication with the specific internal server, but would allow an additional layer of protection by preventing any direct connection to the specific internal server.

Security optimization of the topology may additionally occur by "routing" through specific nodes 120 that provide special functionality (e.g., security). In one example, a cluster 110 may include nodes 120 that are leaf nodes. Leaf nodes preferably enable complete transparency of communication for a communicating through them, and allow only subject specific communication and interaction, instead of general open communication.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for managing a system topology of a distributed computing system comprising:
   providing a network of clusters with at least a first cluster and a second cluster;
   configuring the first cluster with an external gateway configuration of the second cluster and with an internal full mesh topology, wherein the full mesh topology enables nodes within the first cluster to have bi-directional connections to all other nodes within the first cluster;
   distributing the external gateway configuration across at least a subset of nodes of the first cluster;
   establishing a connection between all clusters from the network of clusters, which for the first and second cluster comprises: for each node of the first cluster, establishing a single outbound connection to a select node of the second cluster within at most two hops; and
   managing communication over the system topology between different pairs of origin nodes and receiver nodes of different clusters with dynamic switching between optimistic mode and interest only mode based on traffic volume and interest between pairs of the different clusters, comprising:
      at an origin node of the first cluster when in the optimistic mode, transmitting all communications over the connection except interests corresponding to an unfollow-type subscription interest;
      at a receiver node of the second cluster when in the optimistic mode, in response to receiving an optimistically received communication from the origin node when there is no interest within the nodes of the second cluster, communicating an unfollow-type subscription interest to the origin node;
      at the receiver node of the second cluster when in the interest only mode, communicating a follow-type subscription interest to the origin node;
      at the origin node of the first cluster when in the interest only mode, transmitting only communications that correspond to an interest expressed in the follow-type subscription interest.

2. The method of claim 1, wherein providing a network of clusters comprises providing clusters with a full mesh topology, wherein, in a full mesh topology, all nodes within the cluster have bi-directional connections to all other nodes within the same cluster.

3. The method of claim 2, wherein establishing a connection from the first cluster to the second cluster further comprises: for each node in the first cluster, selecting a select node from the second cluster to establish the connection, wherein selecting the select node is performed distinctly for each node in the first cluster.

4. The method of claim 3, wherein transmitting communications over the connection according to the subscription interest comprises transmitting the communication over the single outbound connection of a node of the first cluster to a node of the second cluster and transmitting the communication within a full-mesh topology of the second cluster.

5. The method of claim 1, wherein the first cluster includes a count of N nodes; and wherein establishing a single outbound connection to one node of the second cluster for each node of the first cluster comprises establishing N single outbound connections from nodes of the first cluster to nodes of the second cluster, wherein every node of the first cluster has exactly one outbound connection; and wherein each node of the first cluster has zero to M inbound connections from the second cluster, where M is the number of nodes in the second cluster.

6. The method of claim 5, wherein for a first node in the first cluster, having P adjacent clusters with a total sum of K nodes in the P adjacent clusters; establishing a connection between all clusters from the network of clusters comprises establishing P outbound connections from the first node and zero to K inbound connections to the first node.

7. The method of claim 1, further comprising, when in an optimistic mode, detecting a first switch condition at the receiver node and changing to the interest only mode.

8. The method of claim 7, further comprising, when in the interest only mode, detecting a second switch condition at the receiver node and changing to the optimistic mode.

9. The method of claim 8, wherein the first and second switch conditions are used for the dynamic switching between optimistic mode and interest only mode are each based in part on the number of subscription interests that are propagated and the number of communications that are transmitted.

10. The method of claim 8, further comprising determining the first switch condition and the second switch condition by threshold modeling.

11. The method of claim 1, wherein the subscription interest is associated with communications by at least a subject or an account.

12. The method of claim 1, further comprising at the second cluster, distributing gateway configuration of a third cluster to the first cluster and establishing adjacency between the first cluster and the third cluster.

13. The method of claim 1, wherein the network of clusters are aware of their physical location, and managing communication over the system topology further comprises incorporating physical location in optimizing communication between clusters.

14. A system for a distributed computing architecture comprising:
   a plurality of computing clusters, wherein each computing cluster comprises a set of nodes with at least one node;
      wherein all nodes within each computing cluster are interconnected in a full mesh topology where each node from the set of nodes of a computing cluster has at least one connection to all other nodes in the set of nodes of the computing cluster; and wherein each computing cluster from the plurality of computing clusters is adjacent to at least one other cluster from the plurality of computing clusters;

wherein each node from the set of nodes of one computing cluster has one outbound connection to a node from the set of nodes of the adjacent cluster; and wherein the plurality computing clusters comprise computer-readable instructions with configuration to:

establish a connection between all clusters from the plurality of computing clusters, where for a given first and second cluster, establish a single outbound connection to a select node of the second cluster within at most two hops for each node of the first cluster, and manage communication over the system topology between different pairs of origin nodes and receiver nodes of different clusters with dynamic switching between optimistic mode and interest only mode based on traffic volume and interest between pairs of the different clusters comprising:

at an origin node of the first cluster when in the optimistic mode, transmitting all communications over the connection except interests corresponding to an unfollow-type subscription interest, at a receiver node of the second cluster when in the optimistic mode, in response to receiving an optimistically received communication from the origin node when there is no interest within the nodes of the second cluster, communicating an unfollow-type subscription interest to the origin node, at the receiver node of the second cluster when in the interest only mode, communicating a follow-type subscription interest to the origin node, and at the origin node of the first cluster when in the interest only mode, transmitting only communications that correspond to an interest expressed in the follow-type subscription interest.

15. The system of claim 14, further comprises at least one client that connects to at least one node of a cluster.

* * * * *